Patented Apr. 25, 1933

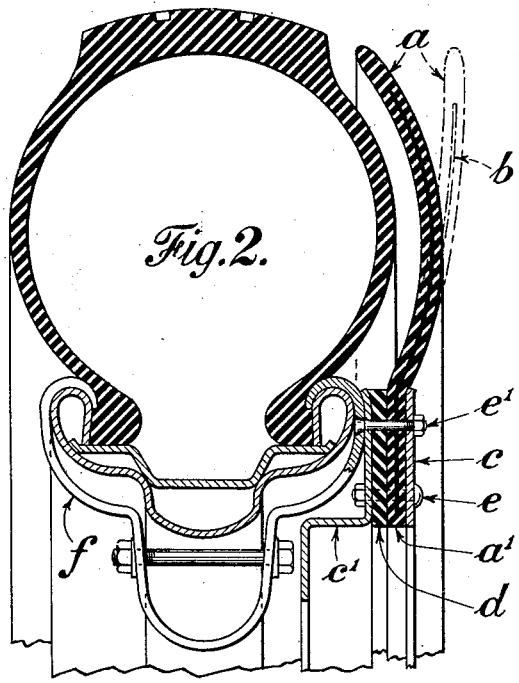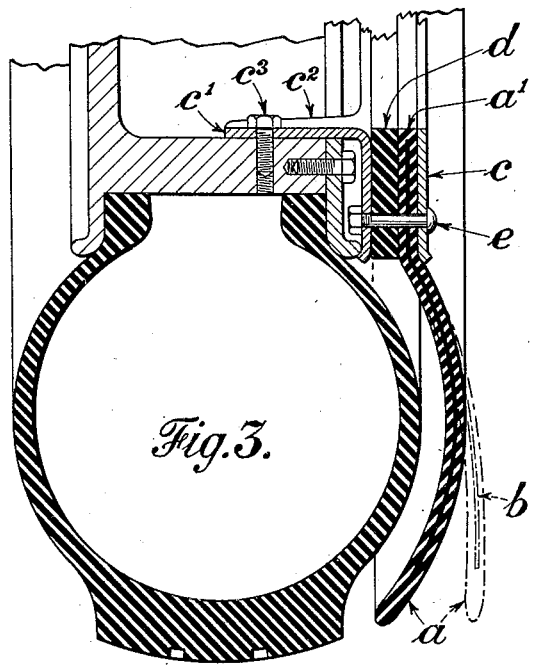

1,905,674

UNITED STATES PATENT OFFICE

ALFRED JAMES BABBS, OF LONGSIGHT, MANCHESTER, ENGLAND

SPLASH GUARD FOR MOTOR VEHICLES

Application filed January 2, 1931, Serial No. 506,236, and in Great Britain August 29, 1930.

This invention refers to splash guards for the wheels of motor vehicles, of the kind comprising a thin flexible rubber or like ring or flap secured to the wheel rim, and adapted to rotate with the wheel, the flap being reinforced with metal strips. In such known constructions the strips are for giving rigidity to the flap, and the flap is held a considerable distance from the wheel tyre, where it is liable to foul a kerbstone or the like, further, the flap in one instance, touches the roadway on its outer edge, and is thus subject to excessive wear besides tending to produce, instead of prevent, splashing. The said known flaps are held by clamping plates to the wheel rim by bolts and nuts, the inner edge of the flap in one case being clamped in a U-shaped metal ring.

The object of this invention is an improved construction of said type of anti-splash guard, which is comparatively cheap, and in operation is very effective, while not being liable to be damaged on meeting a kerbstone.

According to the invention, the improved guard comprises a circular flap of india-rubber, made to a width and shape such as to cause it to cover one side of the wheel tyre and lie close to the tyre but clear of the ground when the wheel is at rest. Intermoulded with said flap are thin metal blades which help to give a slightly curved shape to the flap, and to hold the outer edge of the flap normally close to the tyre, the disposition and nature of the flap and strips being such that on the wheel rotating the free outer edge of the flap by reason of centrifugal action, moves away from the tyre to a position where it serves to intercept any mud thrown up by the wheel, the flap resuming its normal position as the wheel comes to rest.

The improved flap is secured directly to the wheel or to clips or clasps fitted to the wheel according to the type of vehicle wheel.

On the accompanying drawings:—

Fig. 2 is an enlarged cross section of the guard and wheel shown in Fig. 1, and

Fig. 3 is a further cross section of a wheel and guard but showing modified means for connecting the guard to the wheel.

Figure 1:
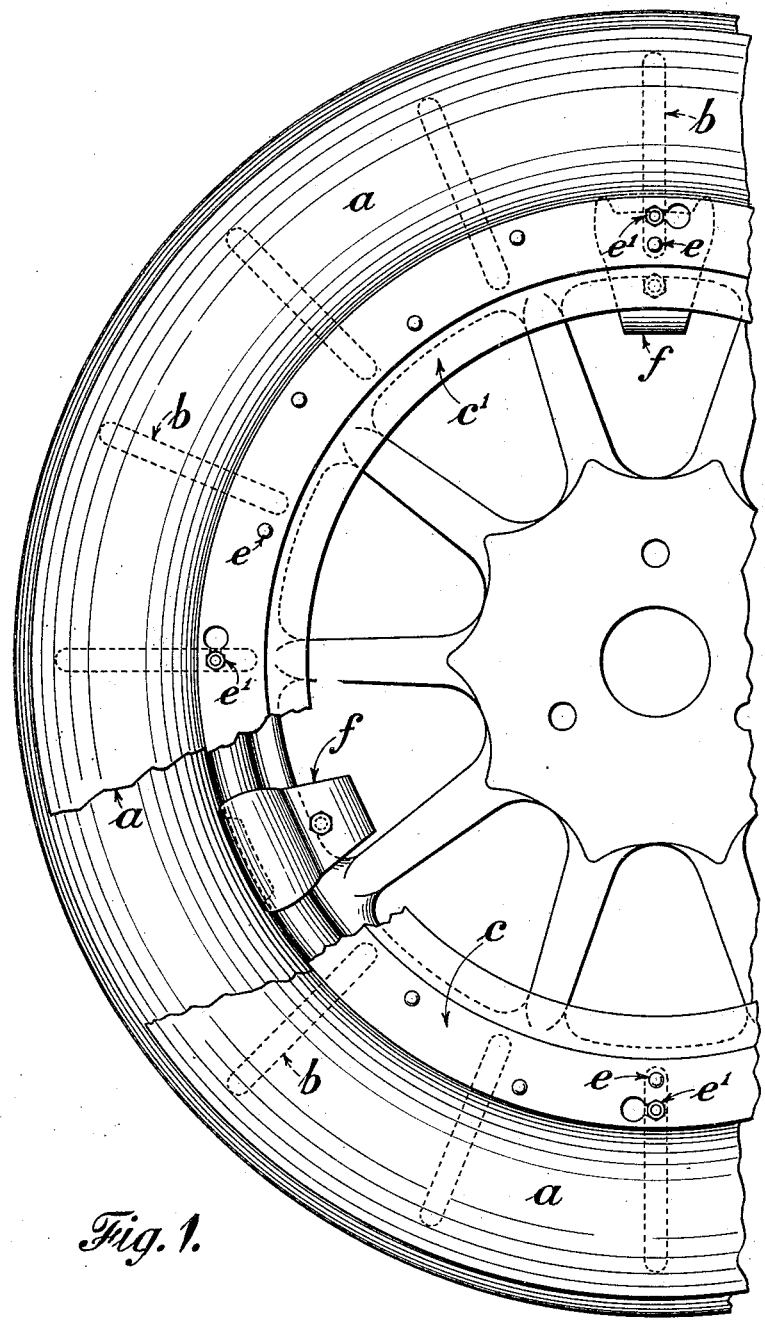
Fig. 1 is an elevation, partly in section, of one form of the improved guard attached to a vehicle wheel.

Referring to Figs. 1 and 2, $a$ is the improved guard, composed of a broad annular band of rubber comparatively thin in cross section, and slightly curved transversely. Such band is preferably reinforced by thin steel strips $b$, which normally help to keep the guard to its shape and hold its lower edge near the wheel tyre, but allow such edge of the guard to move away from the tyre under centrifugal action, and provide the desired chamber into which mud may fly as the wheel travels along a muddy roadway.

The improved guard is formed with a flat inner part $a^1$ and such part is clamped between two metal carrier rings $c$, $c^1$ and a rubber packing or spacing ring $d$ by bolts and nuts $e$ and $e^1$.

In the case of a spoke wheel, the carrier rings $c$, $c^1$ are connected to spring metal clips $f$, which, in turn, embrace the edges of the wheel rim and thus support the carrier rings and guard. In the case of a disc wheel, see Fig. 3, the carrier plates and guard are bolted directly to the wheel rim, the carrier plate $c^1$ having lugs $c^2$, which extend into the wheel and are secured to the wheel by set bolts $c^3$.

In the case of Fig. 2, the clips $f$ have short screwed stud $e^3$ rigidly connected thereto, which pass through key-hole shaped slots in the carrier plate $c$ and thus allow of quick attachment and detachment of the plate and guard from the clips.

The guard $a$ at all times lies clear of the roadway and when the wheel is at rest it occupies the full line position relatively to the wheel tyre, and when the wheel is in motion, the outer part of the guard moves to the position shown in broken lines.

What I claim is:—

1. A splash guard for a vehicle wheel, comprising a flexible ring of uniform thickness throughout and having in cross section an inner straight part and an outer curved part, flat metal springs intermoulded in the ring and arranged radially thereof, a metal clamping ring at each side of the straight part of the flexible ring clamping bolts passing through the clamping rings and the intermediate part of the flexible ring, each clamping bolt passing through one of the intermoulded metal springs, and means for securing the inner clamping ring to the vehicle wheel.

2. A splash guard for a vehicle wheel, comprising a flexible rubber ring of uniform thickness throughout and having in cross section an inner straight part and an outer curved part, conforming to the shape of the tyre, flat metal springs intermoulded in the rubber ring, arranged radially thereof and terminating at points away from the edges of the ring, inner and outer metal clamping rings at the sides of the straight part of the rubber ring, the inner clamping ring being of angled section, a distance piece between the inner clamping ring and the rubber ring, clamping bolts passing through the clamping rings and the intermediate part of the flexible ring, each clamping bolt passing through one of the intermoulded metal springs, and means for securing the inner clamping ring to the vehicle wheel.

In testimony whereof I have signed my name to this specification.

ALFRED JAMES BABBS.